United States Patent [19]

Kinoshita et al.

[11] Patent Number: 5,013,867
[45] Date of Patent: May 7, 1991

[54] LIQUID OXIDATIVELY MODIFIED ETHYLENIC RANDOM COPOLYMER, PROCESS OF MAKING AND USE

[75] Inventors: Tatsuo Kinoshita, Yamaguchi; Shuji Minami, Hiroshima; Kinya Mizui; Ryousuke Kaneshige, both of Chiba, all of Japan

[73] Assignee: Mitsui Petrochemical Industries, Ltd., Tokyo, Japan

[21] Appl. No.: 491,195

[22] Filed: Mar. 9, 1990

Related U.S. Application Data

[62] Division of Ser. No. 173,102, Mar. 28, 1988, Pat. No. 4,943,658.

[51] Int. Cl.$^5$ .............................................. C07C 27/10
[52] U.S. Cl. ................................................. 562/512.2
[58] Field of Search ...................................... 562/512.2

[56] References Cited

U.S. PATENT DOCUMENTS 2,970,164  1/1961  Jezl ................................. 562/512.2
3,692,877  9/1972  Shibahara et al. ............. 260/897 B
4,323,703  4/1982  Grasselli et al. ................ 562/512.2

FOREIGN PATENT DOCUMENTS 967820  8/1964  United Kingdom .

Primary Examiner—Bruce Gray
Attorney, Agent, or Firm—Sherman and Shalloway

[57] ABSTRACT

There is provided a liquid oxidatively modified ethylenic random copolymer, which is an oxidatively modified product of a liquid ethylenic random copolymer comprising 20 to 80 mol % of ethylene and 80 to 20 mol % of α-olefin, and has (i) a number average molecular weight ($\overline{M}n$) in the range of from 200 to 10,000, (ii) a molecular weight distribution ($\overline{M}w/\overline{M}n$) given as weight average molecular weight ($\overline{M}w$) divided by number average molecular weight ($\overline{M}n$) in the range of up to 4, and (iii) an oxygen content of from 0.1 to 20% by weight, an acid value of from 0.1 to 50, and a saponification value of from 0.1 to 100. It is prepared by contacting a corresponding ethylenic random copolymer with oxygen-containing gas at 100°–250° C.

1 Claim, 2 Drawing Sheets

LIQUID OXIDATIVELY MODIFIED ETHYLENIC RANDOM COPOLYMER, PROCESS OF MAKING AND USE

This is a division of Application Ser. No. 07/173,102, filed Mar. 28, 1988, now U.S. Pat. No. 4,945,658.

BACKGROUND OF THE INVENTION

1. Field of the Invention

This invention relates to a liquid oxidatively modified ethylenic random copolymer, a process of making the same and use thereof.

2. Discussion of the Prior Art

A variety of additives are blended in lubricant oils including gear oil, engine oil, grease, metal processing oil and mold release agent in order to improve their performance. The additives are selected depending on the intended use and most additives are polar compounds. In order that the additives attain their intended purpose, the additives are desired to be soluble in base oil of lubricant. Some additives having less affinity to the base oil are not dissolved in the base oil, but are only dispersed in the base oil. Mineral oils were used as the lubricant base oil in the past, but are now largely replaced by synthetic lubricant oils as typified by olefin polymer oils. The above-mentioned tendency is more outstanding with the synthetic lubricant oils, which often fail to fully improve the performance of lubricant oil. In the lubricant oil field, there is a strong need for a compatibilizing agent which can improve the solubility of various additives in the base oil.

A variety of additives are also blended in coating compositions depending on the intended use. For example, micronized silica, micronized precipitating calcium carbonate, bentonite, and organic bentonites are used in the prior art as anti-filler-settling agents, anti-sag agents, and low-temperature flexibility imparting agents. These additives do not function to a full extent in some intended applications. In the painting field, there is a need for a formulating agent which can exert its full function in painting compositions.

SUMMARY OF THE INVENTION

An object of the present invention is to provide a novel liquid oxidatively modified ethylenic random copolymer.

Another object of the present invention is to provide a process for making a liquid oxidatively modified ethylenic random copolymer.

A further object of the present invention is to provide a formulating agent for lubricant oil.

A still further object of the present invention is to provide a formulating agent for painting composition.

We have found that a liquid oxidatively modified ethylenic random copolymer of specific nature is a novel compound and can attain the above objects.

According to a first aspect of the present invention, there is provided a liquid oxidatively modified ethylenic random copolymer, which is an oxidatively modified product of a liquid ethylenic random copolymer comprising 20 to 80 mol % of ethylene and 80 to 20 mol % of α-olefin, and having (i) a number average molecular weight ($\overline{M}n$) in the range of from 200 to 10,000 as measured by a vapor pressure osmometer(VPO), (ii) a molecular weight distribution ($\overline{M}w/\overline{M}n$) given as weight average molecular weight ($\overline{M}w$) divided by number average molecular weight ($\overline{M}n$) in the range of up to 4 as measured by gel permeation chromatography, and (iii) an oxygen content in the range of from 0.1 to 20% by weight, an acid value in the range of from 0.1 to 50, and a saponification value in the range of from 0.1 to 100.

According to a second aspect of the present invention, there is provided a process for preparing a liquid oxidatively modified ethylenic random copolymer, comprising:

contacting a liquid ethylenic random copolymer comprising 20 to 80 mol % of ethylene and 80 to 20 mol % of α-olefin and having a number average molecular weight ($\overline{M}n$) in the range of from 200 to 10,000 as measured by a vapor pressure osmometer, and a molecular weight distribution ($\overline{M}w/\overline{M}n$) given as weight average molecular weight ($\overline{M}w$) divided by number average molecular weight ($\overline{M}n$) in the range of up to 4 as measured by gel permeation chromatography with a gas containing molecular oxygen, ozone or a mixture thereof at a temperature of from 100 to 250° C. to oxidize the copolymer until an oxygen content in the range of from 0.1 to 20% by weight is reached.

The present invention further provides the use of the liquid oxidatively modified ethylenic random copolymer defined above. According to a third aspect of the present invention, there is provided a formulating ingredient for lubricant oil, comprising the liquid oxidatively modified ethylenic random copolymer.

According to a fourth aspect of the present invention, there is provided a formulating ingredient for painting compositions, comprising the liquid oxidatively modified ethylenic random copolymer.

DETAILED DESCRIPTION OF THE INVENTION

The liquid oxidatively modified ethylenic random copolymer of the present invention is an oxidatively modified product of a liquid ethylenic random copolymer comprising 20 to 80 mol % of ethylene and 80 to 20 mol % of α-olefin, preferably 30 to 70 mol % of ethylene and 70 to 30 mol % of α-olefin, more preferably comprising 40 to 60 mol % of ethylene and 60 to 40 mol % of α-olefin. The α-olefin constituting the liquid ethylenic random copolymer includes those α-olefins having 3 to 20 carbon atoms, for example, propylene, 1-butene, 1-pentene, 1-hexene, 4- methyl-1-pentene, 1-octene, 1-decene, 1-dodecene, 1-tetradecene, 1-hexadecene, 1-octadecene, and 1-eicocene.

The liquid oxidatively modified ethylenic random copolymer has (i) a number average molecular weight ($\overline{M}n$) in the range of from 200 to 10,000, preferably from 300 to 8,000, more preferably from 500 to 5,000 as measured by a vapor pressure osmometer(VOP), and (ii) a molecular weight distribution ($\overline{M}w/\overline{M}n$) given as weight average molecular weight ($\overline{M}w$) divided by number average molecular weight ($\overline{M}n$) in the range of up to 4, preferably up to 3.5, more preferably up to 3 as measured by gel permeation chromatography. Liquid oxidatively modified ethylenic random copolymers having a number average molecular weight (Mn) in the range of from 200 to 10,000 are effective as the formulating ingredient for lubricant oil or painting composition. Likewise, liquid oxidatively modified ethylenic random copolymers having a molecular weight distribution (Mw/Mn) of up to 4 are effective as the formulating ingredient for lubricant oil or painting composition.

The liquid oxidatively modified ethylenic random copolymer of the present invention has an oxygen content in the range of from 0.1 to 20% by weight, preferably from 0.5 to 15% by weight, more preferably from 1 to 10% by weight, an acid value in the range of from 0.1 to 50, preferably from 0.2 to 40, more preferably from 0.5 to 35, and a saponification value in the range of from 0.1 to 100, more preferably 0.2–80. Liquid oxidatively modified ethylenic random copolymers having an oxygen content in the range of from 0.1% to 20% by weight or an acid value in the range of from 0.1 to 50 or a saponification value in the range of from 0.1 to 100 are effective as the formulating ingredient for lubricant oil or painting composition.

The liquid oxidatively modified ethylenic random copolymer of the present invention is one in which ethylene and propylene units at the terminal and intermediate of the polymer chain of an ethylenic random copolymer are randomly oxidized and thus has an oxygen containing functional group which is formed by oxidation. Examples of the oxygen-containing functional group include carboxyl, oxycarbonyl (ester bond), formyl, carbonyl, and hydroxyl groups. The content of carboxyl group generally ranges from 0.001 to 1 mol, preferably from 0.01 to 0.8 mol, and the content of oxycarbonyl group (ester bond) generally ranges from 0.001 to 2 mol, preferably from 0.01 to 1.5 mol per 1000 grams of the liquid oxidatively modified ethylenic random copolymer. The total content of formyl and carbonyl groups, that is, total carbonyl group content generally ranges from 0.01 to 15 mol, preferably from 0.05 to 10 mol and the content of hydroxyl group generally ranges from 0.01 to 15 mol, preferably from 0.05 to 10 mol on the same basis as above.

The liquid oxidatively modified ethylenic random copolymer of the present invention is prepared by the oxidative modification of a liquid ethylenic random copolymer having an ethylene content of from 20 to 80 mol %, preferably from 30 to 70 mol %, more preferably from 40 to 60 mol % and an α-olefin content of from 80 to 20 mol %, preferably from 70 to 30 mol %, more preferably from 60 to 40 mol %. The liquid ethylenic random copolymer has (i) a number average molecular weight (Mn) in the range of from 200 to 10,000, preferably from 300 to 8,000, more preferably from 500 to 5,000 as measured by a vapor pressure osmometer, and (ii) a molecular weight distribution (Mw/Mn) given as weight average molecular weight (Mw) divided by number average molecular weight (Mn) in the range of up to 4, preferably up to 3.5, more preferably up to 3 as measured by gel permeation chromatography. Examples of the α-olefin component constituting the liquid ethylenic random copolymer are the same α-olefins having 3 to 20 carbon atoms as described above.

The ethylene component composition of the liquid ethylenic random copolymer generally has a standard deviation ($\sigma$) of up to 3, preferably up to 2, more preferably up to 1. When the ethylene component content of the liquid ethylenic random copolymers has a standard deviation ($\sigma$) of up to 3, the resulting liquid oxidatively modified ethylenic random copolymer becomes more soluble in lubricant oil and painting compositions.

The liquid ethylenic random copolymer may have a B value falling within the following range:

$$1.0 \leq B \leq 1.5$$

wherein B is given by the following equation (I):

$$B = \frac{Poe}{2Po \cdot Pe} \qquad (I)$$

wherein Pe is the molar fraction of the ethylene component in the copolymer,

Po is the molar fraction of the α-olefin component in the copolymer, and

Poe is the molar fraction of the α-olefin-ethylene chain in the total dyad chain. The B value is an index which indicates the distribution of the respective monomer components in the copolymer chain. A higher B value indicates that the copolymer contains less block chain units and has a more uniform distribution of ethylene and α-olefin.

Preferred liquid ethylenic random copolymers have the following B value. The copolymers with an ethylene content of 50 mol % or lower have a B value falling within the following equation:

$$1.0 + 0.2 \times Pe \leq B \leq 1/(1-Pe),$$

preferably $$1.0 + 0.3 \times Pe \leq B \leq 1/(1-Pe),$$

more preferably $$1.0 + 0.4 \times Pe \leq B \leq 1/(1-Pe).$$

The copolymers with an ethylene content of 50 mol % or higher have a B value falling within the following equation:

$$1.2 - 0.2 \times Pe \leq B \leq 1/Pe,$$

preferably $$1.3 - 0.3 \times Pe \leq B \leq 1/Pe.$$

more preferably $$1.4 - 0.4 \times Pe \leq B \leq 1/Pe.$$

These liquid ethylenic random copolymers may be prepared by the methods proposed by the same assignee as the present invention in Japanese Patent Application Kokai No. 57-123205 and Japanese Patent Application No. 60-259835 with a proper choice of polymerization conditions.

The liquid oxidatively modified ethylenic random copolymers of the present invention can be prepared by oxidizing the above-mentioned liquid ethylenic random copolymers with a gas containing molecular oxygen and/or ozone, optionally in an inert hydrocarbon medium. The molecular oxygen-containing gas used for oxidation includes oxygen gas, air, and gaseous mixtures of molecular oxygen diluted with an inert gas such as nitrogen, argon and carbon dioxide to a proper concentration. The ozone-containing gas includes ozone, gaseous mixtures of ozone with oxygen or air, and gaseous mixtures of ozone or ozone plus oxygen or air diluted with an inert gas such as nitrogen, argon and carbon dioxide to a proper concentration. The gas containing molecular oxygen and ozone may be any mixtures of the foregoings.

The inert hydrocarbon medium which may be used in oxidative reaction include, for example, pentane, hexane, heptane, octane, decane, dodecane, kerosine, gas oil, benzene, toluene, and xylene.

Oxidation of the liquid ethylenic random copolymer is generally carried out in the absence of a catalyst, but may be carried out in the presence of a radical initiator or an oxidative catalyst. Examples of the radical initiator include organic peroxides such as benzoyl peroxide, di-tert.-butyl peroxide, tert.-butyl hydroperoxide, dicumyl peroxide, and 2,5-dimethyl-2,5-di(peroxybenzoate)-hexine-3. Examples of the oxidative catalyst include inorganic compounds such as cobalt acetate, manganese chloride, copper, nickel oxide, manganese dioxide, and cobalt naphthenate.

Oxidation of the liquid ethylenic random copolymer is effected at a temperature in the range of from 100° to 250° C., preferably from 120° to 230° C., more preferably from 130° to 200° C. The time taken for the oxidation reaction ranges from 10 minutes to 20 hours, preferably from 30 minutes to 10 hours. The oxidation may be carried out either in atmospheric pressure or in applied pressure. The reaction mixture obtained at the end of oxidative reaction may be worked up by a conventional technique, obtaining the liquid oxidatively modified ethylenic random copolymer of the present invention.

The liquid oxidatively modified ethylenic random copolymer of the present invention may be used as a formulating agent for lubricant oil. As the lubricant oil formulating agent, the present copolymer may be combined with mineral lubricant base oil and any synthetic lubricant oils including olefinic synthetic lubricant base oils (such as olefinic polymer oil or copolymer oils), silicone synthetic lubricant base oils, and ester synthetic lubricant oils. The liquid oxidatively modified ethylenic random copolymer is blended with lubricant base oil in an amount of 0.5 to 300 parts by weight, preferably from 0.8 to 200 parts by weight, more preferably from 1 to 150 parts by weight per 100 parts by weight of the above lubricant base oil. In addition to the base oil and the present copolymer, the lubricant composition may further contain various additives known to be blended in lubricant oil. Examples of the additives include mineral oil (neutral oil), low molecular weight α-olefin polymers, silicone synthetic lubricant oil, ester synthetic lubricant oil, oxidation stabilizers, extreme pressure additives, anti-corrosive agents, defoaming agents, and anti-abrasion agents. These additives may be blended in any desired proportion.

The lubricant oil having the liquid oxidatively modified ethylenic random copolymer blended therein may be used in lubricating applications as gear oil, engine oil, grease, cutting oil, metal processing oil and mold release agent.

The liquid oxidatively modified ethylenic random copolymer of the present invention may also be used as a formulating ingredient for painting composition. Examples of the coating composition in which the present copolymer is blended include painting compositions containing as a film-forming resinous component alkyd resins or modified alkyl resins, unsaturated polyesters or modified unsaturated polyesters, phenol resins, epoxy resins or modified epoxy resins, amino resins such as urea resins and melamine resins, polyurethane resins, condensed painting resins such as drying oil, polymerized painting resins such as acrylic resins and rubbery painting resins. The liquid oxidatively modified ethylenic random copolymer may generally be blended with the film-forming component in an amount of from 0.01 to 20 parts by weight, preferably from 0.1 to 10 parts by weight per 100 parts by weight of the film-forming component. The painting compositions(coating agent) having the present copolymer blended therein may further contain any desired additives known in the prior art, for example, pigments, solvents (in the case of solvent type painting compositions), dispersants (in the case of emulsion type painting compositions), levelling agents, and weathering stabilizers in a suitable amount.

The liquid oxidatively modified ethylenic random copolymer of the present invention may find application not only as a formulating agent for lubricant oil and painting composition, but also in a variety of uses, for example, a dispersant for solid additive in lubricant oil, processing aid for rubber and resins, fiber processing aid, modifier for rubber and resins, plasticizer, ink additive, metal ion scavenger, ion exchange agent, agricultural agent spreader, plasticity-imparting agent for paint, primer modifier for paint, adhesive modifier or the like.

Then, the liquid oxidatively modified ethylenic random copolymer of the present invention may use in the form of an aqueous emulsion, and this emulsion may use, for example as metal processing oil.

EXAMPLES

Examples of the present invention are presented below by way of illustration and not by way of limitation.

In the present invention, shown below are methods for measuring or evaluating the composition and physical properties of liquid oxidatively modified ethylenic random copolymers and liquid ethylenic random copolymers from which the modified copolymers are prepared.

(1) Composition

The composition of ethylene and α-olefin components was determined by $^{13}C$-NMR.

(2) Number average molecular weight ($\overline{Mn}$)

The number average molecular weight ($\overline{Mn}$) of a copolymer was measured by a conventional technique using a vapor pressure osmometer (VPO) in toluene medium at 80° C. The standard samples used as having a known molecular weight were benzyl and squalane.

(3) Molecular weight distribution ($\overline{Mw}/\overline{Mn}$)

The molecular weight distribution ($\overline{Mw}/\overline{Mn}$) was measured according to the method described in Takeuchi, "Gel Permeation Chromatography" (published by Maruzen K.K.) as follows.

Using a standard polystyrene (mono-dispersed polystyene, manufactured by Toyo Soda K.K.) having a known molecular weight, the molecular weight (M) and gel permeation chromatographic (GPC) count of a copolymer were measured to draw a calibration curve for the correlation between molecular weight (M) and elution volume (Ve). The concentration used was 0.02% by weight.

A sample was analyzed by GPC to record a GPC chromatogram. Using the curve, the number average molecular weight ($\overline{Mn}$) and weight average molecular weight ($\overline{Mw}$) based on the polystyrene standard sample were calculated. A $\overline{Mw}/\overline{Mn}$ value is then obtained. The conditions of sample preparation and GPC analysis are described below.

SAMPLE PREPARATION (a) A sample was added to o-dichlorobenzene in a conical flask to a concentration of 0.1% by weight.

(b) The conical flask was heated at 140° C. for one hour. The contents were passed through a stainless steel filter having an opening diameter of 0.5 μm. The filtrate was analyzed by GPC.

GPC

Gel permeation chromatography (GPC) was carried out under the following conditions.

(a) Chromatograph: 150C-ALC/GPC manufactured by Naters
(b) Column: Zorbax type column manufactured by E.I. duPont de Nemours and Company
(c) Temperature: 140° C.
(d) Flow rate: 1 ml/min.

(4) Standard deviation ($\sigma$) of ethylene component composition

A liquid low molecular weight ethylenic copolymer was divided into three fractions of different compositions by extracting it with solvent mixtures of acetone and hexane in different ratios using a separatory funnel by the following method under the following conditions.

SOLVENT EXTRACTION FRACTIONATION

A sample, weighed 40 grams, was dissolved in 300 ml of hexane and the solution was poured into a separatory funnel. At a temperature of 25° C., 500 ml of acetone was added to the funnel. The solvent mixture had a hexane/acetone volume ratio of 5/3. The funnel was shaken and then placed stationarily whereupon the mixture separated into two layers. The lower layer was designated fraction solution FS1. To the upper layer was added 400 ml of acetone. The mixture was shaken and then placed stationarily whereupon it separated into two layers. The lower and upper layers were designated fraction solutions FS2 and FS3, respectively.

Each of the fraction solutions was removed of the solvent by distillation, obtaining fractions F1, F2, and F3.

Each of the fractions was analyzed for ethylene composition by $^{13}$C-NMR. Using the ethylene composition and weight percent of each fraction, the standard deviation ($\sigma$) of the ethylene composition was calculated according to the following equation.

$$E = \sum_i EiWi/\Sigma Wi$$

$$\sigma = \sqrt{\sum_i (Ei - E)^2 Wi}$$

wherein Ei is the ethylene composition of fraction i,
Wi is the weight ratio(weight fraction) of fraction i,
E is an average ethylene composition of the copolymer. The greater the standard deviation ($\sigma$) of the ethylene composition, the wider is the composition distribution.

(5) B value

The B value of the liquid low molecular weight ethylenic random copolymer is defined by the following equation:

$$B = \frac{Poe}{2Po \cdot Pe} \quad (I)$$

wherein Pe is the molar fraction(the content molar fraction) of the ethylene component in the copolymer,
Po is the molar fraction(the content molar fraction) of the α-olefin component in the copolymer, and
Poe is the molar fraction of the α-olefin-ethylene chain in the total dyad chain. The B value is an index which indicates the distribution of the respective monomer components in the copolymer chain. The B value is calculated by determining values of Pe, Po and Poe according to the procedures reported by G.J. Ray, [Macromolecules, 10, 773 (1977)], J.C. Randall, [Macroletules, 15, 353 (1982)], J. Polymer Science, [Polymer Physics, Ed., 11, 275 (1973)], and K. Kimura, [Polymer, 25, 441 (1984)]. A higher B value indicates that the copolymer contains less block chain units and has a more uniform distribution of ethylene and α-olefin.

The B value was calculated by homogeneously dissolving about 200 mg of a copolymer in 1 ml of hexachlorobutadiene in a test tube having a diameter of 10 mm to form a sample, and measuring a $^{13}$C-NMR spectrum of the sample under the conditions: temperature 120° C., frequency 25.05 MHz, spectrum width 1500 Hz, filter width 1500 Hz, pulse repetition time 4.2 sec., pulse width 7 μsec., and accumulated cycle 2000-5000 cycles, and determining Pe, Po and Poe from the spectrum.

(6) Acid value

Acid value was measured by the total acid value measuring method described in JIS K 2501-1980.

(7) Saponification value

Saponification value was measured by the saponification value measuring method described in JIS K 0070-1966.

(8) Oxygen content in percent

Percentage of oxygen content was measured by organic elemental analysis.

(9) Quantitative analysis of hydroxyl group

Quantitative analysis of hydroxyl group was carried out according to the acetylation method described in S. Siggie, "Organic Quantitative Analysis by Functional Groups."

(10) Contents of carboxyl, oxycarbonyl and total carbonyl groups

The contents of carboxyl group, oxycarbonyl group, and total carbonyl groups (carbonyl and formyl groups) were calculated by the following equations.

$$\text{Content of carboxyl group} = \frac{\text{acid value}}{\text{molecular weight of KOH}} \quad (i)$$

(carboxyl group, mol/modified copolymer 1000 g)

$$\text{Content of oxycarbonyl group} = \quad (ii)$$

$$\frac{\text{saponification value} - \text{acid value}}{\text{molecular weight of KOH}}$$

(oxycarbonyl group, mol/modified copolymer 1000 g)

Content of total carbonyl groups = (iii)

(oxygen content, %) × 10/16 − [(content of carboxyl group + content of oxycarbonyl group) × 2 + (content of hydroxyl group)]

(total carbonyl groups, mol/modified copolymer 1000 g)

EXAMPLE 1

A glass reactor with an operating volume of 1.5 liters equipped with an gas inlet tube, an gas outlet tube, a thermometer and an agitator was charged with 800 grams of a liquid ethylene-propylene random copolymer having an ethylene content of 49 mol %, a number average molecular weight ($\overline{Mn}$) of 1,000, a molecular weight distribution ($\overline{Mw}/\overline{Mn}$) of 1.43, an ethylene component composition standard deviation ($\sigma$) of 0.1, a B value of 1.2, and a viscosity of 1040 centipoise at 20° C. The copolymer was agitated at 1000 rpm while the temperature was raised to 200° C. Then dry air was blown for 6 hours through the inlet tube at a rate of 100 liter/hour. The air blowing was terminated, and instead, nitrogen was blown through the inlet tube while the reactor was cooled to room temperature(25° C.). There was obtained an

| | |
|---|---|
| number average molecular weight (Mn): | 940 |
| molecular weight distribution (Mw/Mn): | 1.52 |
| acid value: | 3.7 mgKOH/g |
| saponification value: | 5.40 mgKOH/g |
| oxygen content: | 2.94% by weight |
| viscosity: | 1640 centipoise at 20° C. |
| carboxyl content: | 0.066 mol/1000 g modified copolymer |
| oxycarbonyl content: | 0.030 mol/1000 g modified copolymer |
| hydroxyl content: | 0.60 mol/1000 g modified copolymer |
| total carbonyl content: | 1.50 mol/1000 g modified copolymer |

EXAMPLE 2

The procedure of Example 1 was repeated except that the starting copolymer was a liquid ethylene-propylene random copolymer having an ethylene content of 49 mol %, a number average molecular weight ($\overline{Mn}$) of 1,240, a molecular weight distribution ($\overline{Mw}/\overline{Mn}$) of 1.74, an ethylene component composition standard deviation ($\sigma$) of 0.1, a B value of 1.2, and a viscosity of 4670 centipoise at 20° C., the reaction temperature was 130° C., and the air blowing time was 10 hours. There was obtained an oxidatively modified copolymer, which was a clear yellow liquid having the following physical properties.

| | |
|---|---|
| number average molecular weight (Mn): | 1130 |
| molecular weight distribution (Mw/Mn): | 1.64 |
| acid value: | 15.3 mgKOH/g |
| saponification value: | 25.1 mgKOH/g |
| oxygen content: | 5.97% by weight |
| viscosity: | 12400 centipoise at 20° C. |
| carboxyl content: | 0.27 mol/1000 g modified copolymer |
| oxycarbonyl content: | 0.17 mol/1000 g modified copolymer |
| hydroxyl content: | 0.62 mol/1000 g modified copolymer |
| total carbonyl content: | 2.23 mol/1000 g modified copolymer |

Figure 1:
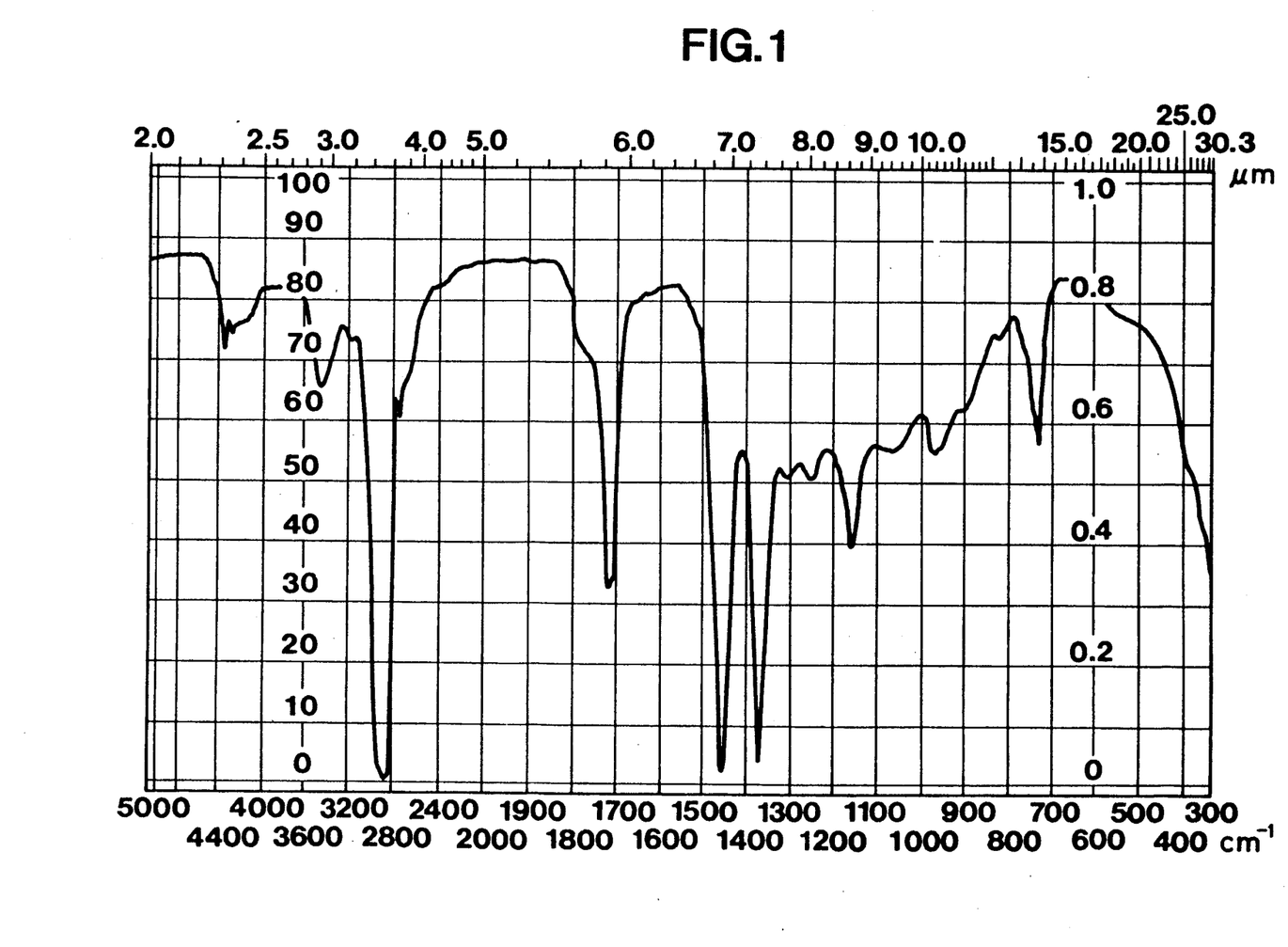
FIG. 1 shows the infrared absorption spectrum of the liquid oxidatively modified ethylenic random copolymer prepared in Example 1.
Figure 2:
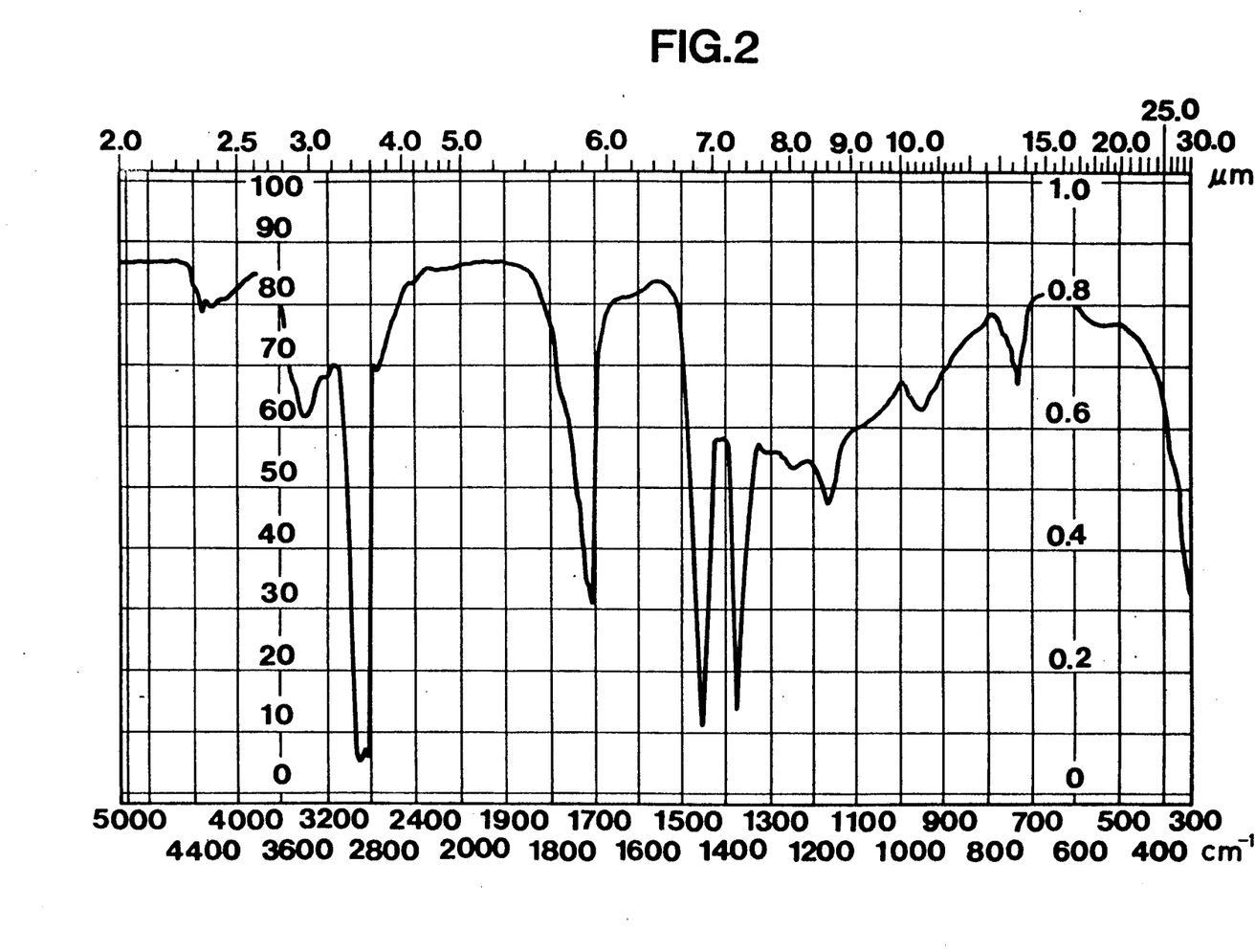
FIG. 2 shows the infrared absorption spectrum of the liquid oxidatively modified ethylenic random copolymer prepared in Example 2.

The infrared absorption spectrum of the modified copolymer of this example is shown in FIG. 2.

Evaluation 1

The oxidatively modified ethylenic random copolymer was evaluated for its performance as lubricant oil formulating agent by the following method.

(1) Preparation of sample

In a 300-ml beaker were admitted 65 parts by weight of poly α-olefin oligomer A (Mobil SHF-1001, manufactured by Mobil Chemical) and 35 parts by weight of poly α-olefin oligomer B (Synfluid Gost PAO, manufactured by Chevron Chemical). They were thoroughly mixed with a glass bar. To the mixture were added 1 part by weight of a commercially available gear oil package type additive (TC9535, manufactured by Texaco, containing 24.1% of S and 1.8% of P) and 2 parts by weight of the oxidatively modified ethylenic random copolymer obtained in Example 1. The mixture was further admixed to prepare lubricant sample I.

For comparison purpose, lubricant sample II was prepared by the same procedure as above except that the oxidatively modified copolymer was omitted.

(2) Evaluating procedure (a) Compatibility 100 ml of sample was added to a glass container having a diameter of 40 mm and allowed to stand overnight. The sample was determined for clarity. That is, the light absorbance of the sample at a wavelength of 660 nm was measured by a spectrophotometer using a glass cell of 50 mm and hexane as the reference.

Rating

| Absorbance | <0.05 | 0.05–0.15 | 0.15–0.25 | 0.25–0.35 | >0.35 |
|---|---|---|---|---|---|
| Point | 5 | 4 | 3 | 2 | 1 |

(b) Heat stability

The glass container containing the sample part of which had been used in the compatibility test was kept in a constant temperature bath at 80° C. for one month. Thereafter, the sample was taken out of the bath, allowed to stand at room temperature(25° C.) overnight, and then determined for clarity by the same procedure as (a).

(c) Anti-emulsification

The time taken until disappearance of an emulsion layer was measured according to the procedure of JIS K 2520.

Rating

| Time, min. | <10 | 10-30 | 30-60 | 60-480 | >480 |
|---|---|---|---|---|---|
| Point | 5 | 4 | 3 | 2 | 1 |

(3) Results

TABLE 1

| | Lubricant sample | |
|---|---|---|
| | I | II |
| Compatibility | 5 | 2 |
| Heat stability | 4 | 1 |
| Anti-emulsification | 5 | 5 |

Evaluation 2

The oxidatively modified ethylenic random copolymer was evaluated for its performance as painting composition formulating agent by the following method.

(1) Preparation of sample 85 parts by weight of epoxy resin A (Epomik R-140, manufactured by Mitsui Petrochemical Industries, Ltd.), 15 parts by weight of epoxy resin B (Epomik R-094, manufactured by Mitsui Petrochemical Industries Ltd.), and 3 parts by weight of the oxidatively modified copolymer obtained in Example 2 were thoroughly mixed. To the mixture, 35 parts by weight of silica flour (Crystalite -1, manufactured by Tatsumori Kogyo Co.) was added and thoroughly mixed, obtaining epoxy paint I.

For comparison purpose, epoxy paint II was prepared by the same procedure as above except that the oxidatively modified copolymer was replaced by a commercially available vegetable oil polymerized type anti-settling agent.

(2) Evaluating procedure (a) Pigment settling rate

A capped glass container having an inner diameter of 18 mm and a height of 45 mm was charged with sample up to a level of 40 mm and then allowed to stand for one month. Pigment setting rate after one month was determined by the following equation:

Pigment settling rate $(\%) = 1/\text{lo} \times 100$ wherein lo is the level of the painting filling the container, and
1 is the length of an upper supernatant layer formed as a result of settling of pigment after one month standing.

(b) Sag

To 100 parts by weight of test paint was added 28 parts by weight of a modified polyamine curing agent (Epomik Q-636, manufactured by Mitsui Petrochemical Industries Ltd.). The mixture was thoroughly admixed and applied onto a glass plate. Immediately after coating, the plate was placed upright. While the plate was kept upright, the coating cured. The coating was observed for sag. The maximum coating thickness below which the coating did not sag was determined.

(c) Results

TABLE 2

| | Epoxy paint | |
|---|---|---|
| | I | II |
| Pigment settling rate | 0% | 60% |
| Sag (maximum coating thickness) | 120 μm | <75 μm |

We claim:
1. A process for preparing a liquid oxidatively modified ethylenic random copolymer comprising:
contacting a liquid ethylenic random copolymer comprising 20 to 80 mol % of ethylene and 80 to 20 mol % of α-olefin and having a number average molecular weight ($\overline{M}n$) in the range of from 200 to 10,000 as measured by a vapor pressure osmometer, and a molecular weight distribution ($\overline{M}w/\overline{M}n$) given as weight average molecular weight ($\overline{M}w$) divided by number average molecular weight ($\overline{M}n$) in the range of up to 4 as measured by gel permeation chromatography with a gas containing molecular oxygen, ozone or a mixture thereof at a temperature of from 100° to 250° C. to oxidize the copolymer until an oxygen content in the range of from 0.1 to 20% by weight is reached.

* * * * *

UNITED STATES PATENT AND TRADEMARK OFFICE
CERTIFICATE OF CORRECTION

PATENT NO. : 5,013,867
DATED : May 7, 1991
INVENTOR(S) : TATSUO KINOSHITA, ET AL.

It is certified that error appears in the above-identified patent and that said Letters Patent is hereby corrected as shown below: On the title page:

Add --[30] Foreign Application Priority Data, March 26, 1987 [JP] Japan.................62-70216--.

Column 1, line 1, change "4,945,658" to --4,943,658--.

Column 7, line 58, formula

" $E = \sum_{i} E_i W_i / \sum W_i$ "    should read

-- $\bar{E} = \sum_{i} E_i W_i / \sum W_i$ --.

Column 7, line 60, formula

" $\sigma = \sqrt{\sum_{i} (E_i - E)^2 W_i}$ "    should read

-- $\sigma = \sqrt{\sum_{i} (E_i - \bar{E})^2 W_i}$ --.

UNITED STATES PATENT AND TRADEMARK OFFICE
CERTIFICATE OF CORRECTION

PATENT NO. : 5,013,867
DATED : May 7, 1991
INVENTOR(S) : TATSUO KINOSHITA, ET AL.

It is certified that error appears in the above-identified patent and that said Letters Patent is hereby corrected as shown below:

Column 9, line 31, after "an" insert --oxidatively modified copolymer, which was a clear yellow liquid having the following physical properties.--.

Column 9, line 48, before "EXAMPLE 2", insert the paragraph --The infrared absorption spectrum of the modified copolymer of this example is shown in FIG. 2.--.

Column 11, line 32, "Crystalite -1" should read --Crystalite A-1--.

Signed and Sealed this

First Day of June, 1993

Attest:

MICHAEL K. KIRK

*Attesting Officer*  Acting Commissioner of Patents and Trademarks